United States Patent
Kawamura et al.

(10) Patent No.: US 8,048,835 B2
(45) Date of Patent: Nov. 1, 2011

(54) GREASE COMPOSITION AND GREASE-ENCLOSED BEARING

(75) Inventors: Takayuki Kawamura, Kuwana (JP); Mitsunari Asao, Kuwana (JP); Masaki Egami, Kuwana (JP)

(73) Assignee: NTN Corporation, Osaka (JP)

( * ) Notice: Subject to any disclaimer, the term of this patent is extended or adjusted under 35 U.S.C. 154(b) by 358 days.

(21) Appl. No.: 11/547,427

(22) PCT Filed: Mar. 25, 2005

(86) PCT No.: PCT/JP2005/005478
§ 371 (c)(1),
(2), (4) Date: Sep. 29, 2006

(87) PCT Pub. No.: WO2005/097955
PCT Pub. Date: Oct. 20, 2005

(65) Prior Publication Data
US 2007/0287646 A1    Dec. 13, 2007

(30) Foreign Application Priority Data
Apr. 2, 2004  (JP) .................. 2004-109558

(51) Int. Cl.
*C10M 115/06* (2006.01)
*C10M 169/02* (2006.01)
*F16C 19/00* (2006.01)
(52) U.S. Cl. ....................... 508/590; 384/462
(58) Field of Classification Search ........... 508/590; 384/462
See application file for complete search history.

(56) References Cited

U.S. PATENT DOCUMENTS

| 4,985,161 A * | 1/1991 | Tohzuka et al. ............... 508/182 |
| 6,605,574 B2 * | 8/2003 | Asao et al. ..................... 508/376 |
| 6,673,750 B2 * | 1/2004 | Hirata et al. ................... 508/136 |
| 2002/0137639 A1 | 9/2002 | Asao et al. |

(Continued)

FOREIGN PATENT DOCUMENTS

JP     04-236298     8/1992

(Continued)

OTHER PUBLICATIONS

Solvay Solexis, Fomblin PFPE: Lubricants Prooduct Data Sheet, Dec. 13, 2002, www.solvaysolexis.com, pp. 1-4.*

(Continued)

*Primary Examiner* — Glenn Caldarola
*Assistant Examiner* — Vishal Vasisth
(74) *Attorney, Agent, or Firm* — Hedman & Costigan, P.C; James V. Costigan

(57) ABSTRACT

The present invention provides a grease composition capable of securely preventing generation of a low-temperature abnormal noise when it is cold and a grease-enclosed bearing. A grease composition comprises a base oil and a thickener, wherein the base oil has a pour point not more than −50° C. and a kinematic viscosity not less than 15 mm$^2$/s at 40° C. The base oil is at least one oil selected from a PAO oil and a perfluoro ether oil. The thickener is at least one substance selected from a urea compound and a fluororesin. A mixing consistency of the grease composition is in the range of 250 to 350. A grease-enclosed bearing has an inner ring, an outer ring, rolling elements interposed between the inner ring and the outer ring, and a grease composition enclosed on a periphery of the rolling elements. The grease-enclosed bearing is used for an automotive electric auxiliary machine.

4 Claims, 1 Drawing Sheet

U.S. PATENT DOCUMENTS

| | | |
|---|---|---|
| 2003/0069147 A1* | 4/2003 | Kawamura et al. ........... 508/555 |
| 2004/0198612 A1 | 10/2004 | Asao |
| 2005/0196086 A1* | 9/2005 | Terada et al. ................. 384/523 |

FOREIGN PATENT DOCUMENTS

| | | |
|---|---|---|
| JP | 09-208982 | 8/1997 |
| JP | 11-080766 | 3/1999 |
| JP | 11-270566 | 10/1999 |
| JP | 2000-119673 | 4/2000 |
| JP | 2000-273478 | 10/2000 |
| JP | 2001-003070 | 1/2001 |
| JP | 2002-250351 | 6/2002 |
| JP | 2002-221231 | 8/2002 |
| JP | 2002-327759 | 11/2002 |
| JP | 2003-176831 | 6/2003 |
| JP | 2003-269469 | 9/2003 |
| JP | 2003-293797 | 10/2003 |
| JP | 2004-003596 | 1/2004 |
| JP | 2004-026941 | 1/2004 |
| JP | 2004-028326 | 1/2004 |
| JP | 2004-346298 | 12/2004 |
| JP | 2004-352786 | 12/2004 |
| JP | 2005-105238 | 4/2005 |
| JP | 2005-132879 | 5/2005 |

OTHER PUBLICATIONS

International Search Report, Jun. 13, 2005.
EP Search Report Dated Dec. 29, 2009.

* cited by examiner

GREASE COMPOSITION AND GREASE-ENCLOSED BEARING

This application is a 371 of PCT/JP05/05478, filed Mar. 25th, 2005.

TECHNICAL FIELD

The present invention relates to a grease composition enclosed in a bearing incorporated in various industrial machines, vehicles, and the like and more particularly, to a grease composition preferable for a bearing used at a high rotational speed in a wide temperature range from a high temperature to an ultra-low temperature at which a low-temperature abnormal noise is generated.

BACKGROUND ART

A grease composition is enclosed in a bearing incorporated in various industrial machines and vehicles to impart lubricity to the bearing. The grease composition is prepared by kneading a base oil and a thickener. As the base oil, synthetic oils such as a mineral oil, an ester oil, a silicone oil, an ether oil, a fluorine oil, and the like are generally used. As the thickener, metal soap such as lithium soap, urea compounds, fluororesin are generally used.

In recent years, a rolling bearing tends to be used at a high rotational speed. Thus the grease composition is demanded to have durability at a high temperature. When the metal soap is used as the thickener, oxidation of the base oil is accelerated at the high temperature and thus lubricating action deteriorates. Regarding the base oil, the grease composition containing the mineral oil as the base oil thereof is oxidized more readily than the grease composition containing the synthetic oil as the base oil thereof and thus has a short lubricating life at the high temperature. Thus in recent years, the grease composition containing the synthetic oil as the base oil thereof and the urea compound or the fluororesin as the thickener thereof is mainly used for the rolling bearing which is used at the high temperature and speed.

As various industrial mechanical members become compact and have high performance, use conditions tend to be strict. Consequently the grease composition is demanded to have a higher lubricating performance and a longer lubricating life. In compliance with the demand for the longer lubricating life, the addition of an antioxidant and an antiseptic agent to the grease composition containing a synthetic oil having a high viscosity as its base oil and an urea compound as its thickener is investigated. This grease composition is liable to generate the low-temperature abnormal noise when it is cold.

When a pulley and the like to be driven by an engine of a car is operated when it is cold, there is a case in which an abnormal noise (hoot noise) is generated when it is cold, namely, a low-temperature abnormal noise is generated. Although the reason of the generation of the low-temperature abnormal noise has not been clarified, it is supposed that the low-temperature abnormal noise is generated owing to a self-excited vibration of a rolling element caused by nonuniformity of an oily film of grease. That is, when it is cold, the oily film of the raceway surface is liable to be nonuniform owing to a rise of the viscosity of the base oil of the grease. The oily film causes the coefficient of friction between the rolling element and the raceway surface to make a slight periodical change. Thereby the rolling element generates the self-excited vibration. Owing to the self-excited vibration of the rolling element, the pulley and the like resonate with the bearing. As a result, the outer ring vibrates (translational motion) axially to generate a low-temperature abnormal noise.

As the grease excellent in the durability at the high temperature and preventing the generation of the low-temperature abnormal noise, grease containing mixed oil of synthetic hydrocarbon oil and ester synthetic oil in which not less than eight ester groups are disposed like the teeth of a comb at one side of not less than eight carbon atoms constituting chain-shaped molecules of oil; an urea compound mixed with the base oil as a thickener; and dithiophosphate added to the base oil thereof as an extreme-pressure agent is known (see patent document 1).

A bearing for use in a pulley of a car in which a grease composition containing a base oil composed of a mixed oil of poly-α-olefin (hereinafter abbreviated as PAO) oil and an ester oil; an alicyclic diurea compound mixed with the base oil as a thickener; and zinc dithiocarbamate as an additive added to the base oil is known. In the bearing, a contact angle is formed by bringing each of a plurality of balls interposed between an inner ring and an outer ring both constituting the bearing into contact with the inner ring or with at least the outer ring at two points (see patent document 2).

These attempts are aimed at the stability of the oily film when it is cold to prevent the generation of the low-temperature abnormal noise and at a long life of the grease composition at the high temperature. But these attempts are incapable of obtaining a sufficient effect in preventing the generation of the low-temperature abnormal noise.

Patent document 1: Japanese Patent Application Laid-Open No. 9-208982
Patent document 2: Japanese Patent Application Laid-Open No. 11-270566

DISCLOSURE OF THE INVENTION

Problem to be Solved by the Invention

It is an object of the present invention to provide a grease composition capable of securely preventing the generation of a low-temperature abnormal noise when it is cold and a grease-enclosed bearing.

Means for Solving the Problem

A grease composition of the present invention comprises a base oil and a thickener, wherein the base oil has a pour point not more than −50° C. and a kinematic viscosity not less than 15 mm$^2$/s at 40° C. The thickener comprises at least one substance selected from among a urea compound and a fluororesin.

The mixing consistency of the grease composition is in the range of 250 to 350. The base oil is at least one oil selected from among a PAO oil and a perfluoro ether oil.

In the present invention, the pour point is a value measured by using the method specified in JIS K2269, and the mixing consistency is a value of 60-times mixing consistency measured by using the method specified in JIS K2220.

A grease-enclosed bearing of the present invention includes an inner ring, an outer ring, rolling elements interposed between the inner ring and the outer ring, and a grease composition enclosed on the periphery of the rolling elements. The grease-enclosed bearing is used for an automotive electric auxiliary machine.

Effect of the Invention

The grease composition of the present invention contains the base oil and the thickener. The base oil has the pour point not more than −50° C. and the kinematic viscosity not less than 15 mm²/s at 40° C. The thickener is at least one substance selected from among the urea compound and the fluororesin. Therefore the grease composition to be enclosed in a bearing displays a preferable lubricity in a wide temperature range from a low temperature to a high temperature, is capable of preventing the generation of the low-temperature abnormal noise immediately after the bearing starts to operate at the low temperature, and is capable of maintaining a property excellent in durability at the high temperature for a long time and thus allows the bearing to have a long life.

Because the mixing consistency of the grease composition is in the range of 250 to 350, the grease composition displays a preferable lubricity in the wide temperature range from the low temperature to the high temperature and is capable of preventing the generation of the low-temperature abnormal noise immediately after the bearing starts to operate at the low temperature.

Because the base oil is at least one oil selected from among the PAO oil and the perfluoro ether oil, the grease composition maintains the lubricating performance at the high temperature and is securely preventing the generation of the low-temperature abnormal noise when it is cold.

The grease-enclosed bearing has the inner ring, the outer ring, the rolling elements interposed between the inner ring and the outer ring, and the grease composition enclosed on the periphery of the rolling elements. Therefore the grease composition displays a preferable lubricity in the wide temperature range from the low temperature to the high temperature and is capable of preventing the generation of the low-temperature abnormal noise immediately after the bearing starts to operate at the low temperature. Further the grease composition is capable of maintaining the property excellent in durability at the high temperature for a long time and thus allows the bearing to have a long life.

Because the grease-enclosed bearing is used for an automotive electric auxiliary machine, the grease composition maintains the lubricating performance at the high temperature and is securely preventing the generation of the low-temperature abnormal noise in the car when it is cold.

EXPLANATION OF REFERENCE SYMBOLS AND NUMERALS

Figure 1:
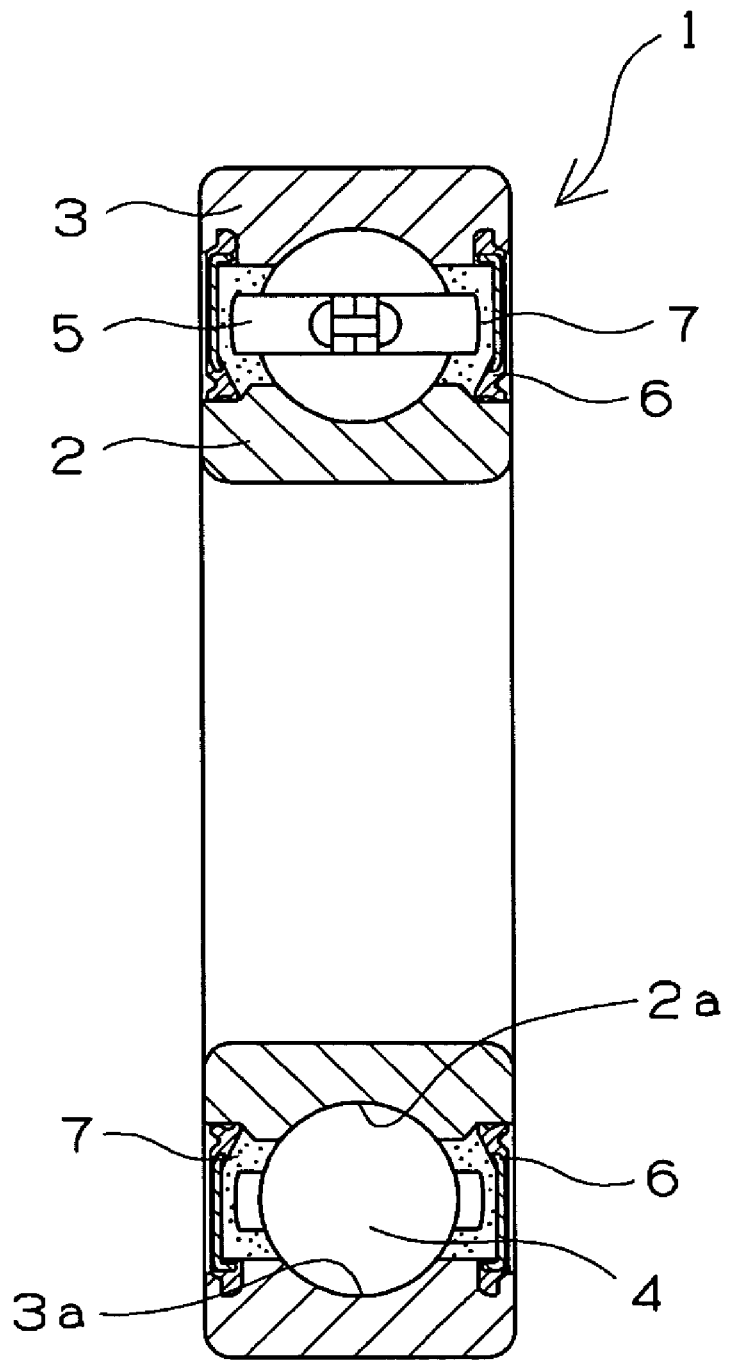
FIG. 1 is a sectional view of a deep groove ball bearing.

| | |
|---|---|
| 1: | deep groove ball bearing |
| 2: | inner ring |
| 3: | outer ring |
| 4: | rolling element |
| 5: | cage |
| 6: | seal member |
| 7: | grease composition |

BEST MODE FOR CARRYING OUT THE INVENTION

It has been found that a grease composition containing a base oil having a pour point not more than −50° C. and a kinematic viscosity not less than 15 mm²/s at 40° C. has a constant durability at a high temperature and an improved performance of preventing the generation of a low-temperature abnormal noise. It is considered that owing to the use of the base oil, the effect of preventing the generation of the low-temperature abnormal noise is increased by preventing a rise of the viscosity of the grease composition when it is cold and an oily film of a raceway surface of a bearing from becoming nonuniform. The present invention is based on the above-described finding.

As the base oil which can be used in the present invention, a mineral oil, a synthetic oil, and a mixture of the mineral oil and the synthetic oil which are normally used for grease can be used when they have a pour point not more than −50° C. and a kinematic viscosity not less than 15 mm²/s at 40° C.

A pour point depressant such as polymethacrylate may be added to the base oil to set the pour point of the base oil to not more than −50° C. To prevent deterioration of the lubricating performance and a decrease of the lubricating life of the grease composition at a high temperature and speed, the base oil is required to have a kinematic viscosity not less than 15 mm²/s at 40° C. and favorably a high viscosity not less than 30 mm²/s at 40° C.

As the mineral oil, it is possible to list a paraffin mineral oil and a naphthene mineral oil. As the synthetic oil, it is possible to list a synthetic hydrocarbon oil, an ether oil, an ester oil, and a fluorine oil.

As the synthetic hydrocarbon oil, a PAO oil and the like can be listed. As the ether oil, a dialkyl diphenyl ether oil, an alkyl triphenyl ether oil, and an alkyl tetraphenyl ether oil can be listed. As the ester oil, a diester oil, a polyol ester oil, a complex ester oil of these oils, and an aromatic ester oil can be listed.

As the fluorine oil, a perfluoro polyether oil can be used.

In consideration of the lubricating performance and lubricating life of the grease composition at high temperature and speed, it is preferable that the grease composition contains a synthetic oil of a synthetic hydrocarbon oil, an alkyl diphenyl ether oil, an ester oil, and the fluorine oil. It is especially preferable that the grease composition contains at least one oil selected from among the PAO oil which is the synthetic hydrocarbon oil and a perfluoro ether oil which is the fluorine oil.

As the above-described PAO oil, normally the above-described PAO oil is an oligomer of α-olefin or isomerized α-olefin or mixtures of polymers. As examples of the α-olefin, it is possible to list 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-docosene, and 1-tetracosene. Normally, mixtures of these substances are used.

As the perfluoro polyether oil, it is possible to use a compound formed by replacing hydrogen atoms of an aliphatic hydrocarbon polyether with fluorine atoms. Exemplifying the perfluoro polyether oil, perfluoro polyether having a side chain shown by the following chemical formulas 1 and 2 and a straight-chain perfluoro polyether shown by the following chemical formulas 3 through 5 are used. These oils can be used singly or as a mixture thereof. Reference symbols m and n denote integers.

It is possible to exemplify "FOMBLIN Y" (commercial name, produced by Montedison Inc.) as a commercially available product shown by the chemical formula 1, "Krytox" (commercial name, produced by DuPont Inc.) and "BARRIERTA J" oil (commercial name, produced by Kluber Inc.) as commercially available products shown by the chemical formula 2, "FOMBLIN Z" (commercial name, produced by Montedison Inc.) as a commercially available product shown by the chemical formula 3, "FOMBLIN M" (commercial name, produced by Montedison Inc.) as a commercially available product shown by the chemical formula 4, and "DEM-NUM" (commercial name, produced by DAIKIN INDUSTRIES. LTD) as a commercially available product shown by the chemical formula 5.

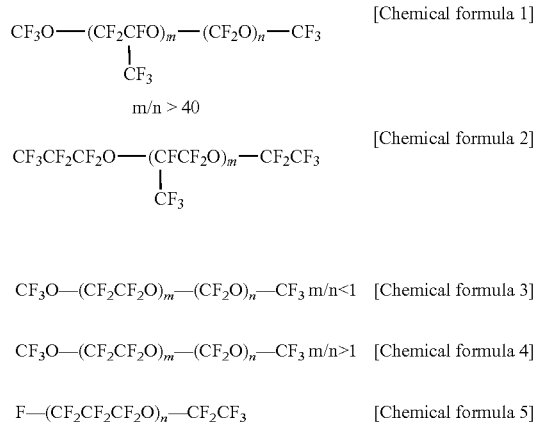

The thickener that can be used in the present invention is a urea compound, fluororesin powder, and a mixture of the urea compound and the fluororesin powder. It is preferable to use the urea compound as the thickener for the above-described synthetic oil and the fluororesin powder as the thickener for the above-described perfluoro polyether oil.

As the urea compound, diurea having two urea bonds in its molecules is preferable and is shown by the following chemical formula 6.

where $R_1$ and $R_3$ indicate any one of an aromatic hydrocarbon group having 6 to 12 carbon atoms, an aliphatic hydrocarbon group having 6 to 20 carbon atoms, or an alicyclic hydrocarbon group having 6 to 20 carbon atoms. $R_1$ and $R_3$ may be identical to or different from each other. $R_2$ indicates an aromatic hydrocarbon group having 6 to 12 carbon atoms.

As an example of a method of producing the urea compound, a diisocyanate compound and an amine compound are prepared to react with each other by using the isocyanate group and the amino group in an equivalent. Besides the diurea, polyurea or the like can be used.

Powder which has an affinity for the perfluoro polyether oil and is stable at a high temperature can be used for the fluororesin which can be used to thicken the perfluoro polyether oil. Exemplifying the fluororesin, perfluororesins such as polytetrafluoroethylene (PTFE), a tetrafluoroethylene-perfluoroalkylvinyl ether copolymer (PFA), a tetrafluoroethylene-hexafluoropropylene copolymer (FEP) are preferable. The polytetrafluoroethylene is especially preferable because it is stable at a high temperature.

It is preferable that the content of the thickener is in the range of 5 to 50 parts by weight based on 100 parts by weight of the total amount of said base oil and said thickener. If the content of the thickener is less than 5 parts by weight, the grease composition becomes liquid and has a low viscosity and is thus liable to leak. Thus it is difficult to enclose the grease composition in a bearing. If the content of the thickener is more than 50 parts by weight, the grease composition becomes solid and the consistency thereof becomes less than 100. Therefore the grease composition cannot be practically used as grease to be enclosed in the bearing.

It is preferable that the mixing consistency of the grease composition which can be used in the present invention is in the range of 250 to 350. If the mixing consistency of the grease composition is less than 250, the grease composition has an inferior lubricating performance at a low temperature. It is not preferable that the mixing consistency of the grease composition is more than 350 because the grease composition is liable to leak.

The grease composition of the present invention contains the base oil and the thickener as its essential components. The grease composition may further contain conventional additives for use in grease such as an extreme-pressure agent, an antioxidant, a rust resisting agent, a metal-inactivating agent, an oily agent, and the like. These additives are shown below.

Extreme-Pressure Agent

By using the extreme-pressure agent, the withstand load and extreme pressure resistance of the grease composition can be improved. For example, it is possible to use the following compounds as necessary: As organometallic compounds, organic molybdenum compounds such as molybdenum dithiocarbamate and molybdenum dithiophosphate; organic zinc compounds such as zinc dithiocarbamate, zinc dithiophosphate, and zinc phenate; organic antimony compounds such as antimony dithiocarbamate and antimony dithiophosphate; organic selenium compounds such as selenium dithiocarbamate; organic bismuth compounds such as bismuth naphthenate and bismuth dithiocarbamate; organic iron compounds such as ferric dithiocarbamate and ferric octynoate; organic copper compounds such as copper dithiocarbamate and copper naphthenate; organic lead compounds such as lead naphthene and lead dithiocarbamate; organic tin compounds such as tin maleate and dibutyltin sulfide; organic sulfonate, phenate, phosphonate of alkali metal and alkali earth metal; and organometallic compounds containing gold, silver, titanium, and the like. As sulfur-based compounds, it is possible to use a sulfide compound such as dibenzyl disulfide or a polysulfide compound, sulfurized fats and oils, compounds of ash-free carbamic acid, thiourea compounds, and thiocarbonates. As a phosphoric acid-based extreme-pressure agent, it is possible to use phosphate such as trioctyl phosphate and tricresyl phosphate; and phosphate compounds such as acidic phosphate, phosphite, and acidic phosphite. In addition, it is possible to use a halogen-based extreme-pressure agent such as chlorinated paraffin or solid lubricants such as molybdenum disulfide, tungsten disulfide, graphite, polytetrafluoroethylene, antimony sulfide, and boron compounds such as boron nitride. Of these extreme-pressure agents, compounds of dithiocarbamic acid and those of dithiophosphoric acid can be preferably used.

Antioxidant

As the antioxidant, an age resistor, an ozone deterioration preventive agent, and an antioxidant to be added to rubber, plastics, lubricant, and the like can be selectively used. For example, the following compounds can be used: amine compounds such as phenyl-1-naphtylamine, phenyl-2-naphtylamine, diphenyl-p-phenylenediamine, dipyridylamine, phenothiazine, N-methylphenothiazine, N-ethylphenothiazine, 3,7-dioctylphenothiazine, p,p'-dioctyldiphenylamine, N,N'-diisopropyl-p-phenylenediamine, and N,N'-di-sec-butyl-p-phenylenediamine.

Phenol antioxidants can be also used. As the phenol antioxidants, 2,6-di-t-dibutylphenol, n-octadecyl-3-(3',5'-di-tert-butyl-4-hydroxyphenyl)propionate, tetrakis-(methylene-3-(3',5'-di-t-butyl-4-hydroxyphenyl)propionate)methane, 2,2'- methylenebis-(4-methyl-6-t-butylphenol), and 4,4'-butylidenebis-(3-methyl-6-t-butylphenol) are listed.

Rust Resisting Agent

As the rust resisting agent, the following compounds can be used: That is, ammonium salts of organic sulfonic acid; organic sulfonates of alkali metal and alkali earth metal such as magnesium barium and calcium; organic sulfonates of zinc; organic carboxylate; phenate, phosphonate, derivatives of alkyl and alkenyl succinic acid such as alkyl and alkenyl succinates; partial ester of polyvalent alcohol such as sorbitan monooleate; hydroxy fatty acids such as oleoyl sarcosine; mercapto fatty acids such as 1-mercapto stearate or metal salts thereof; higher fatty acids such as stearate; higher alcohols such as isostearyl alcohol; esters of higher alcohols and higher fatty acids; thiazoles such as 2,5-dimercapto-1,3,4-thiaziazole, 2-mercaptothiaziazole, and the like; imidazole compounds such as 2-(decyldithio)-benzimidazole, benzimidazole, and the like; disulfide compounds such as 2,5-bis (dodecyldithio)-benzimidazole, and the like; phosphate such as tris(nonylphenyl)phosphite; and thiocarboxylate such as dilauryl thiopropionate and the like. It is also possible to use corrosion inhibitors such as nitrite, nitrate, chromate, phosphate, molybdate, and tungstate all having a function of passivating the surface of metal.

Metal-Inactivating Agent:

As the metal-inactivating agent, triazole compounds such as benzotriazole and tolyltriazole can be used.

Oily Agent

As the oily agents, the following compounds can be used: fatty acids such as oleic acid, stearic acid, and the like; fatty alcohols such as oleyl alcohol, and the like; fatty esters such as polyoxyethylene stearate, polyglyceryl oleate, and the like; phosphoric acid; and phosphates such as tricresylphosphate, laurate, polyoxyethylene oleyl ether phosphate, and the like.

An example of the grease-enclosed bearing of the present invention is shown in FIG. 1. FIG. 1 is a sectional view of a deep groove ball bearing.

In a grease-enclosed bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. The grease-enclosed bearing 1 further includes a cage 5 holding the rolling elements 4 and a seal member 6 fixed to the outer ring 3. Grease composition 7 is applied to at least the peripheries of rolling elements 4.

EXAMPLE

Examples 1 through 13

The base oil and the thickener were mixed with each other at ratios shown in table 1 to obtain a grease composition of each of the examples. Reference symbol MDI in tables 1 and 2 denotes 4,4'-diphenylmethane diisocyanate. The generation of a low-temperature abnormal noise was measured and a life test of the grease compositions at a high temperature were conducted on the obtained grease compositions. The test method and the test condition are shown below.

Comparison Examples 1 through 10

The base oil and the thickener were mixed with each other at ratios shown in table 2 to obtain a grease composition of each of the comparison examples. In a manner similar to that of the examples, the generation of the low-temperature abnormal noise was measured and a life test of the grease compositions at the high temperature were conducted on the obtained grease compositions.

Measurement of Low-Temperature Abnormal Noise 0.9 g of the grease composition of each of the examples and the comparison examples was enclosed in rolling bearings (6203) respectively. Each rolling bearing was placed in a cryostat having a temperature of −50° C. for a certain period of time and taken out therefrom. Thereafter each rolling bearing was mounted on a bearing rotating apparatus set to a room temperature. When the temperature of the rolling bearing became −20° C., the bearing rotating apparatus was rotated at 2700 rpm under a radial load of 127 N to aurally check whether the low-temperature abnormal noise was generated. The generation of the low-temperature abnormal noise was evaluated by the ratio of the number of the rolling bearings which generated the low-temperature abnormal noise to the total of the number of the rolling bearings. Table 1 shows the evaluated results of the examples. Table 2 shows the evaluated results of the comparison examples.

Life Test of Grease at High Temperature 1.8 g of the grease composition of each of the examples and the comparison examples was enclosed in rolling bearings (6204) respectively. The bearing rotating apparatus was rotated at 10000 rpm under an axial load of 67 N and a radial load of 67 N. The time required for seizing to occur was measured. The temperature of the bearing was evaluated at 200° C. in the case of the fluorine grease and at 150° C. in the case of other greases. Table 1 shows the evaluated results of the examples. Table 2 shows the evaluated results of the comparison examples.

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Mixing (part by weight) | | | | | | | | | | | | | |
| Base oil | | | | | | | | | | | | | |
| Synthetic hydrocarbon oil A | 85 | 73 | 70 | 85 | 77 | — | — | — | — | — | — | — | — |
| Synthetic hydrocarbon oil B | — | — | — | — | — | 85 | 85 | — | — | — | — | — | — |
| Ester oil B | — | — | — | — | — | — | — | 85 | 85 | — | — | — | — |
| Alkyl diphenyl ether oil | — | — | — | — | — | — | — | — | — | 85 | 85 | — | — |
| Perfluoro polyether oil A | — | — | — | — | — | — | — | — | — | — | — | 75 | — |
| Perfluoro polyether oil B | — | — | — | — | — | — | — | — | — | — | — | — | 75 |
| Thickener | | | | | | | | | | | | | |
| Urea compound | | | | | | | | | | | | | |
| Octylamine | 7.6 | 13.7 | 15.2 | — | — | 7.6 | — | 7.6 | — | 7.6 | — | — | — |
| Cyclohexylamine | — | — | — | 6.6 | — | — | 6.6 | — | 6.6 | — | 6.6 | — | — |

TABLE 1-continued

| | | | | | | | | | | | | | |
|---|---|---|---|---|---|---|---|---|---|---|---|---|---|
| p-toluidine | — | — | — | — | 10.7 | — | — | — | — | — | — | — | — |
| MDI | 7.4 | 13.3 | 14.8 | 8.4 | 12.3 | 7.4 | 8.4 | 7.4 | 8.4 | 7.4 | 8.4 | — | — |
| Fluororesin (PTFE) | — | — | — | — | — | — | — | — | — | — | — | 25 | 25 |
| Properties | | | | | | | | | | | | | |
| 60-times mixing consistency (JIS K2220) | 284 | 240 | 219 | 278 | 318 | 276 | 291 | 251 | 255 | 293 | 286 | 285 | 275 |
| Low-temperature abnormal noise | 0/10 | 2/10 | 3/10 | 0/10 | 0/10 | 0/10 | 0/10 | 3/10 | 2/10 | 2/10 | 2/10 | 0/10 | 0/10 |
| Life at high temperature (hour) | 3800 | 3100 | 2700 | 4200 | 3900 | 4100 | 3700 | 3500 | 3600 | 2300 | 2800 | 5100 | 6800 |

| | Pour point | Kinematic viscosity(40° C.) | Maker | Commercial name |
|---|---|---|---|---|
| Synthetic hydrocarbon oil A | −57° C. | 47 mm$^2$/s | Nippon Steel Chemical Co., Ltd. | SHINFIELD 801 |
| Synthetic hydrocarbon oil B | −50° C. | 63 mm$^2$/s | Mitsui Chemicals, Inc. | LUCANT HC10 |
| Ester oil B | −52° C. | 33 mm$^2$/s | Kao Corporation | KAOLUBE 268 |
| Alkyl diphenyl ether oil | −50° C. | 31.1 mm$^2$/s | Matsumura Oil Presearch Corp. | MORESCO HILUBE LB32 |
| Perfluoro polyether oil A | −67° C. | 65 mm$^2$/s | DuPont | L-65 |
| Perfluoro polyether oil B | −67° C. | 100 mm$^2$/s | DuPont | L-100 |

TABLE 2

| | Comparison Example | | | | | | | | | |
|---|---|---|---|---|---|---|---|---|---|---|
| | 1 | 2 | 3 | 4 | 5 | 6 | 7 | 8 | 9 | 10 |
| Mixing (part by weight) Base oil | | | | | | | | | | |
| Synthetic hydrocarbon oil | 85 | 85 | — | — | — | — | — | — | — | — |
| Ester oil A | — | — | 85 | 85 | — | — | — | — | — | — |
| Ester oil B | — | — | — | — | — | — | — | — | 89 | — |
| Alkyl diphenyl ether oil | — | — | — | — | 85 | 85 | 77 | — | — | — |
| Mineral oil | — | — | — | — | — | — | — | 85 | — | — |
| Perfluoro polyether oil | — | — | — | — | — | — | — | — | — | 76 |
| Thickener | | | | | | | | | | |
| Lithium 12-hidroxystearate | — | — | — | — | — | — | — | — | 11 | — |
| Urea compound | | | | | | | | | | |
| Octylamine | 7.6 | — | 7.6 | — | 7.6 | — | — | 7.6 | — | — |
| Cyclohexylamine | — | 6.6 | — | 6.6 | — | 6.6 | — | — | — | — |
| p-toluidine | — | — | — | — | — | — | 10.7 | — | — | — |
| MDI | 7.4 | 8.4 | 7.4 | 8.4 | 7.4 | 8.4 | 12.3 | 7.4 | — | — |
| Fluororesin (PTFE) | — | — | — | — | — | — | — | — | — | 24 |
| Properties | | | | | | | | | | |
| 60-times mixing consistency (JIS K2220) | 273 | 271 | 260 | 264 | 287 | 277 | 302 | 257 | 251 | 287 |
| Low-temperature abnormal noise | 7/10 | 6/10 | 6/10 | 7/10 | 7/10 | 8/10 | 8/10 | 2/10 | 0/10 | 7/10 |
| Life at high temperature (hour) | 3100 | 3700 | 1800 | 1400 | 4100 | 4300 | 4600 | 370 | 740 | 3800 |

| | Pour point | Kinematic viscosity(40° C.) | Maker | Commercial name |
|---|---|---|---|---|
| Synthetic hydrocarbon oil | −47.5° C. | 152 mm$^2$/s | Nippon Steel Chemical Co., Ltd. | LUCANT HC20 |
| Ester oil A | −42° C. | 27 mm$^2$/s | AKZONOBEL | KL305 |
| Ester oil B | −52° C. | 33 mm$^2$/s | Kao Corporation | KAOLUBE 268 |
| Alkyl diphenyl ether oil | −40° C. | 97 mm$^2$/s | Matsumura Oil Presearch Corp. | MORESCO HILUBE LB100 |
| Mineral oil | −50° C. | 8.5 mm$^2$/s | NIPPON OIL CORPORATION | KRISEF FB |
| Perfluoro polyether oil | −36° C. | 160 mm$^2$/s | DuPont | GPL-105 |

It is understood from tables 1 and 2 that the bearings in which the grease compositions of the examples each containing the base oil having the pour point not more than −50° C. were enclosed generated much less low-temperature abnormal noise than the bearings in which the grease compositions of the comparison examples were enclosed. This is because owing to the use of the base oil, a rise of the viscosity of the grease composition when it is cold is prevented, and the oily film of the raceway surface of the bearing is prevented from becoming nonuniform. Thereby the effect of preventing the generation of the low-temperature abnormal noise increased. Therefore the grease composition can be preferably used for a bearing to be used when it is cold and particularly for a bearing for use in an electric auxiliary machine.

INDUSTRIAL APPLICABILITY

The grease composition of the present invention displays a preferable lubricity in a wide temperature range from a low temperature to a high temperature and is capable of preventing the generation of the low-temperature abnormal noise immediately after a bearing starts to operate at the low temperature. Therefore the bearing in which the grease composition of the present invention is enclosed can be preferably used for a vehicle such as a car when it is cold.

The invention claimed is:

1. A grease composition for use in a bearing for an automotive electric machine, said grease composition being capable of preventing the generation or a low-temperature abnormal noise and having a durability at the high temperature, said grease composition comprising one base oil and one thickener, wherein said base oil consists of a perfluoropolyether oil having a pour point not more than −67° C. and a kinematic viscosity not less than 65 mm$^2$/s at 40° C.; and said one thickener consists of 5 to 50 parts by weight, based on 100 parts by weight of the total amount of said one base oil and said one thickener, of polytetrafluoroethylene said grease composition having a mixing consistency in the range of 275-285.

2. A grease-enclosed bearing comprising an inner ring, an outer ring, rolling elements interposed between said inner ring and said outer ring, and a grease composition which is enclosed on a periphery of said rolling elements, wherein said grease composition is the grease composition according to claim 1.

3. The grease-enclosed bearing, according to claim 2, which is used for an automotive electric auxiliary machine.

4. A grease composition for use in a bearing for an automotive electric auxiliary machine, said grease composition being capable of preventing the generation of a low-temperature abnormal noise and having a durability at the high temperature, said grease composition comprising one base oil and one thickener, wherein said one base oil consists of a perfluoropolyether oil having a pour point not more than −67° C. and a kinematic viscosity in the range of 65 to 100mm$^2$/s at 40° C.; and said one thickener consists of 25 parts by weight based on 100 parts by weight of the total amount of said one base oil and said one thickener, of polytetrafluoroethylene, said grease composition having a mixing consistency in the range of 275 to 285.

* * * * *